United States Patent

Iguchi

[11] Patent Number: 6,088,175
[45] Date of Patent: Jul. 11, 2000

[54] OPTICAL FILTER APPARATUS

[75] Inventor: Tomomi Iguchi, Omiya, Japan

[73] Assignee: Fuji Photo Optical Co., Ltd., Saitama, Japan

[21] Appl. No.: 08/805,313

[22] Filed: Feb. 25, 1997

[30] Foreign Application Priority Data

Mar. 28, 1996 [JP] Japan .................................. 8-099414

[51] Int. Cl.[7] .............................. G02B 5/22; G02B 27/14; H04N 9/07
[52] U.S. Cl. ...................... 359/892; 359/889; 359/891; 359/634; 348/336; 348/337
[58] Field of Search .................... 359/892, 889, 359/634, 891; 348/336, 337, 338, 339

[56] References Cited

U.S. PATENT DOCUMENTS

| | | | |
|---|---|---|---|
| 3,610,818 | 10/1971 | Bachmann | 348/337 |
| 4,524,383 | 6/1985 | de Rooij | 358/55 |
| 4,549,787 | 10/1985 | Tanner | 359/892 |
| 5,005,947 | 4/1991 | Sibilo et al. | 359/892 |

*Primary Examiner*—Audrey Chang
*Attorney, Agent, or Firm*—Snider & Associates; Ronald R. Snider

[57] ABSTRACT

In an optical filter apparatus in which a filter loading disk having a plurality of filters is rotated around a rotation axis so as to position a desired filter onto an optical axis of a color separation prism, the filter loading disk and the rotation axis are unitedly formed, while the rotation axis is supported by a housing member disposed in front of and behind the disk, thereby reducing the number of parts to decrease the manufacturing cost of the apparatus while preventing the disk from fluctuating upon rotation. In a filter disk (8), a disk holding section (8A) holding a plurality of filters (9) and an axis section (8B) are unitedly formed, thereby reducing the number of parts. The axis section (8B) is supported by an axial hole (1A) and an axial hole (4A) of a dust cover (4) so as to increase the fitting length of the axis section (8B), thereby preventing the filter disk (8) from fluctuating upon rotation.

5 Claims, 4 Drawing Sheets

OPTICAL FILTER APPARATUS

RELATED APPLICATIONS

This application claims the priority of Japanese Patent Application No. 8-99414 filed on Mar. 28, 1996, which is incorporated herein by reference.

BACKGROUND OF THE INVENTION

1. Field of the Invention

The present invention relates to an optical filter apparatus loaded in a broadcasting video camera or the like and, more specifically, to an optical filter apparatus which rotates a filter loading disk having a plurality of filters so as to position a desired filter onto an optical axis of a color separation prism.

2. Description of the Prior Art

In a broadcasting video camera or the like, white light carrying captured image information is separated by a color separation prism into three color light components of R, G, and B, which are then received by CCDs so as to form an image. Also provided is an optical filter apparatus in which a special effect filter such as ND filter, CC filter, or infrared filter is disposed in front of the color separation prism so as to adjust the quantity or characteristic of light incident on the color separation prism according to the circumstance under which the image is captured.

The configuration of a conventional optical filter apparatus will be explained with reference to FIGS. 3 and 4. FIG. 3 is a cross-sectional view showing the configuration of the conventional optical filter apparatus, whereas FIG. 4 is an enlarged view showing the configuration of an axis member which will be explained later.

As shown in FIG. 3, provided in front of a color separation prism 26 in which three prisms 26B, 26G, and 26R are cemented together is a filter disk 28 in which a plurality of filters 29 are disposed around a rotation axis X thereof. The filter disk 28 comprises a disk holder section 28A and a bearing section 28B. An axis member 30 made of a metal having a flange portion is fitted into the bearing section 28B, allowing the filter disk 28 to rotate and slide around the axis member 30. Formed at the tip portion of the axis member 30 is a male screw 30A. As the male screw 30A engages with a female screw 21A formed in a prism housing 21, the filter disk 28 is rotatably attached to the prism housing 21.

A gear section 28C is formed around the bearing section 28B of the filter disk 28, whereas a driving knob 31 for rotating the filter disk 28 is attached to the prism housing 21. A gear 32 attached to a rotation axis 31A of the driving knob 31 and the gear section 28C of the filter disk 28 engage with each other by way of an idle gear 33. Accordingly, as the driving knob 31 is rotated, the filter disk 28 rotates around the center axis X of the axis member 30.

Thus, the filter disk 28 is rotated so as to position the desired filter 29 onto the optical axis of the color separation prism 26, whereby the quantity or characteristic of the light incident on the color separation prism 26 is adjusted.

In the foregoing prior art, however, in addition to the main body of the filter disk 28, the axis member 30 which is fitted into the bearing section 28B thereof is necessary, thereby increasing the number of parts. Also, when assembling the apparatus, a step for fitting the axis member 30 into the filter disk 28 and engaging the axis member 30 with the prism housing 21 is necessary, thereby increasing the labor required for manufacture. Consequently, the cost for making a video camera adopting the optical filter apparatus has increased.

Further, as shown in FIG. 4, since fitting length L2 between the bearing section 28B of the filter disk 28 and the axis member 30 is not so large, there may occur fluctuation in rotation when the filter disk 28 is rotated, such that the filter 29 is obliquely positioned with respect to the optical axis of the color separation prism 26, thereby deteriorating the optical performance of the filter 29. Also, the peripheral portion of the filter disk 28 may rotate while abutting to the prism housing 21 disposed in front of and behind it, thereby wearing off, yielding a powder of wear dust, which may adhere to the filter 29 or the color separation prism 26.

SUMMARY OF THE INVENTION

In view of these circumstances, it is an object of the present invention to provide an optical filter apparatus which can reduce the cost for making the video camera, while decreasing the rotational fluctuation of the filter disk.

The optical filter apparatus in accordance with the present invention is an optical filter apparatus comprising a filter loading disk which has a plurality of filters disposed around a rotation axis placed in front of a color separation prism and is rotated around the rotation axis so as to position a desired filter onto an optical axis of the color separation prism, wherein the filter loading disk and the rotation axis are unitedly formed, while the rotation axis is projected in front of and behind the filter loading disk and supported by a housing member disposed in front of and behind the filter loading disk.

DETAILED DESCRIPTION OF THE PREFERRED EMBODIMENTS

In the following, embodiments of the present invention will be explained with reference to the drawings.

Figure 1:
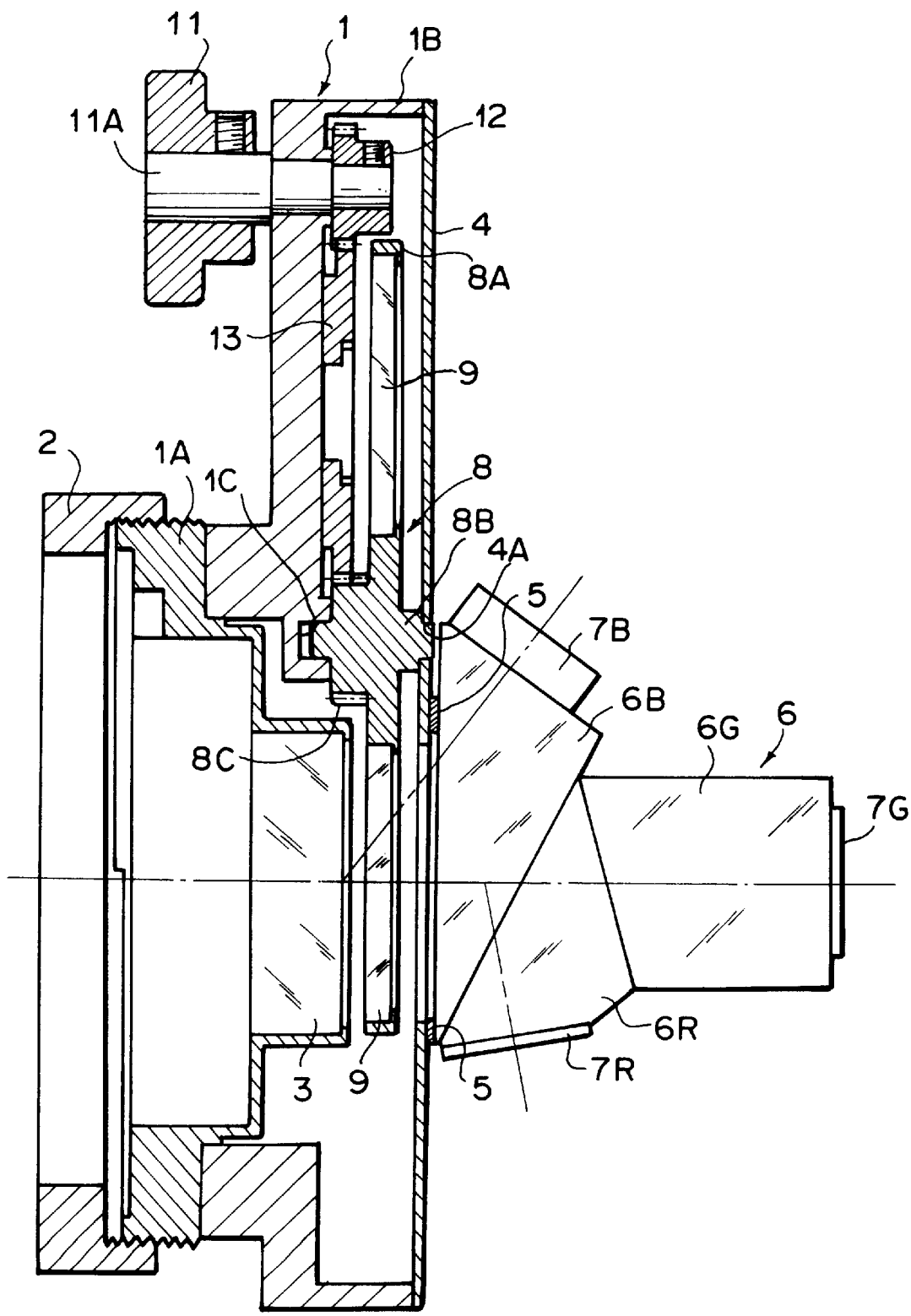
FIG. 1 is a cross-sectional view showing the optical filter apparatus in accordance with an embodiment of the present invention.
Figure 2:
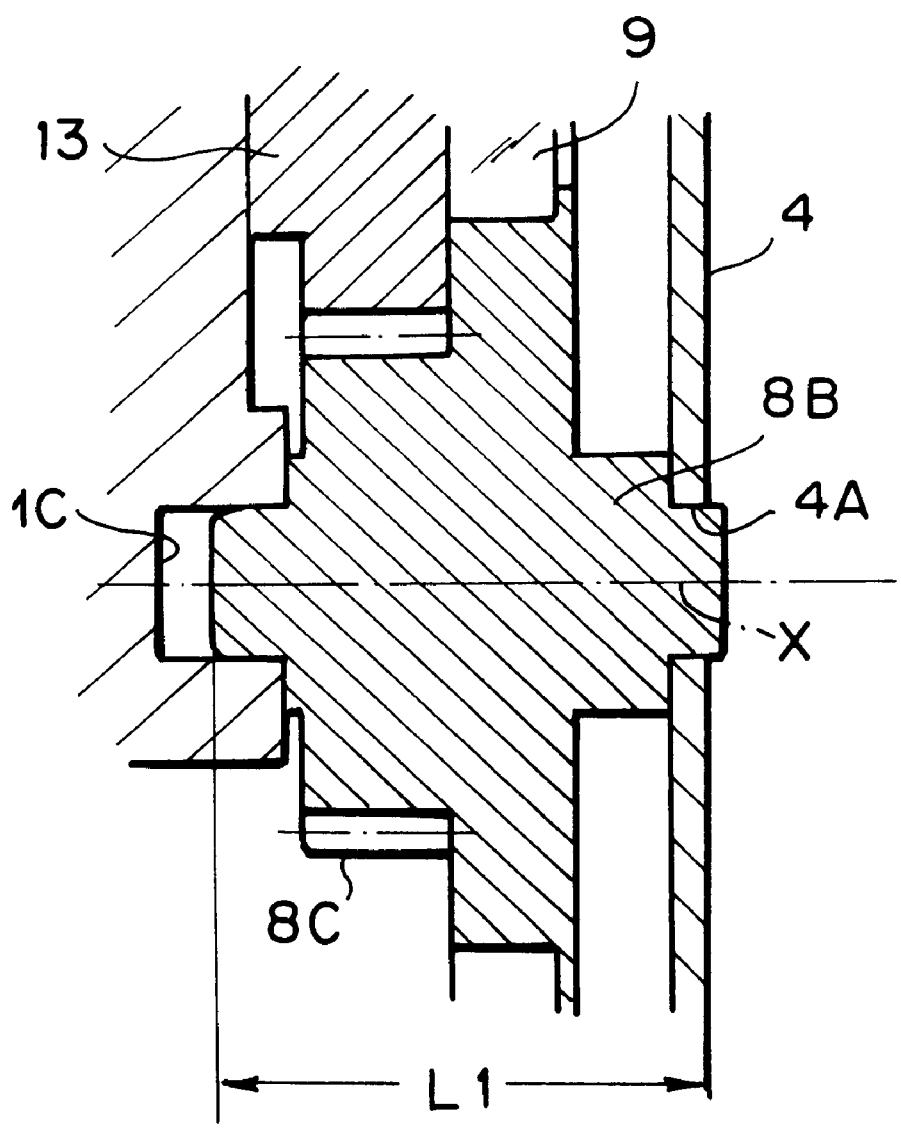
FIG. 2 is an enlarged view of an axis section shown in FIG. 1.
Figure 3:
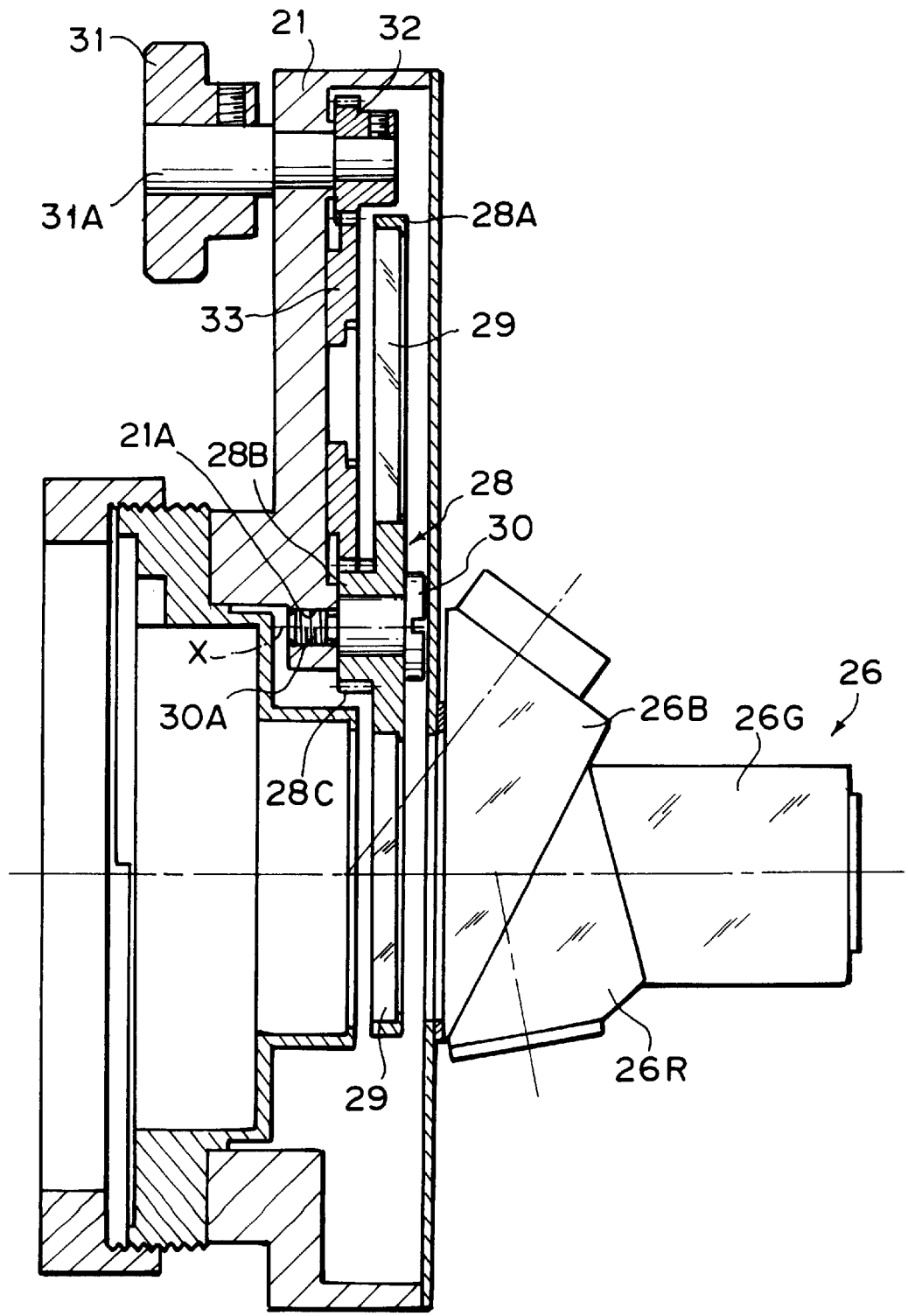
FIG. 3 is a cross-sectional view showing a conventional optical filter apparatus.

FIG. 1 is a cross-sectional view showing the configuration of the optical filter apparatus in accordance with an embodiment of the present invention, whereas FIG. 2 is an enlarged view of a rotation axis which will be explained later. As shown in FIG. 1, the optical filter apparatus of this embodiment, which comprises a prism housing 1 and a filter disk 8, is disposed immediately in front of a color separation prism 6 of an imaging system.

Engaged with a front portion 1A of the prism housing 1 is a lens mount ring 2 to which various kinds of lenses can be attached. Disposed downstream of the lens mount ring 2 is a filter 3 such as IR cut filter or low-pass filter. Attached to a rear portion 1B of the prism housing 1 is a dust cover 4, made of a thin metal, for preventing dust and dirt from intruding into the prism housing 1. The filter disk 8 is disposed within a space formed by the prism housing 1 and the dust cover 4, while the color separation prism 6 is attached to the dust cover 4 by way of a spacer 5 for preventing dust and dirt from intruding into the prism housing 1. Namely, the filter disk 8 is placed downstream of the filter 3 but upstream of the color separation prism 6.

The color separation prism 6 comprises three prisms 6B, 6R, and 6G which are cemented together. A B-reflecting dichroic layer is placed on the interface between the prisms 6B and 6R, while an R-reflecting dichroic layer is placed on the interface between the prisms 6R and 6G. Accordingly, white light incident on the color separation prism 6 is separated into three color components of R, G, and B, which are then made incident on CCDs 7B, 7R, and 7R disposed on the exit end surfaces of the prisms 6B, 6R, and 6G, respectively.

The filter disk 8, in which a disk holding section 8A and an axis section 8B which are unitedly formed, is made by injection molding of a plastic material such as PC (polycarbonate). Also, the axis section 8B is formed so as to project in front of and behind the filter disk 8.

In the disk holding section 8A, a plurality of filters 9 such as ND filters, CC filters, or special effect filters are disposed on a circumference around a rotation axis X.

The tip of the axis section 8B is fitted into an axial hole 1C formed in the rear portion 1B of the prism housing 1, whereas the rear end thereof is fitted into an axial hole 4A formed in the dust cover 4. Accordingly, the filter disk 8 is rotatably supported by the prism housing 1 and the dust cover 4.

Further, cutouts corresponding to the number of the filters 9 are formed in the peripheral portion of the filter disk 8 so as to engage with plate springs which are not depicted. Accordingly, clicking feel can be obtained when the desired filter 9 is positioned onto the optical axis of the color separation prism 6.

A gear section 8C is formed around the axis section 8B of the filter disk 8. Also, a driving knob 11 for rotating the filter disk 8 is attached to the prism housing 1. A gear 12 attached to a rotation axis 11A of the driving knob 11 and the gear section 8C of the filter disk 8 engage with each other by way of an idle gear 13. As this driving knob 11 is rotated, the filter disk 8 rotates around the center axis X of the axis section 8B of the filter disk 8 as its rotation axis. Thus, the filter disk 8 is rotated so as to position the desired filter 9 onto the optical axis of the color separation prism 6, whereby the quantity of the light incident on the color separation prism 6 is adjusted, for example.

In general, the rotational speed of the filter disk 8 is low. Accordingly, torque during the rotation thereof is not so large. Therefore, when the axis section 8B and the disk holding section 8A are unitedly formed of a plastic material, no problem occurs in terms of strength.

Thus, since the disk holding section 8A and the axis section 8B are unitedly formed in the filter disk 8 of the optical filter apparatus in accordance with this embodiment, unlike the filter disk of the above-mentioned prior art, it is unnecessary for an axis member to be separately provided. Consequently, the number of parts can be reduced. Also, in order to manufacture the apparatus, the filter disk 8 can be attached to the prism housing 1 simply as the tip of the axis section 8B is fitted into the axial hole 1C formed in the prism housing 1 and then the rear end of the axis section 8B is fitted into the axial hole 4A when the dust cover 4 is attached to the prism housing 1. Accordingly, the step for engaging the axis member with the prism housing in the above-mentioned prior art can be eliminated. Thus, the optical filter apparatus in accordance with this embodiment can reduce the number of parts and the number of manufacturing steps, thereby decreasing the manufacturing cost.

Figure 4:
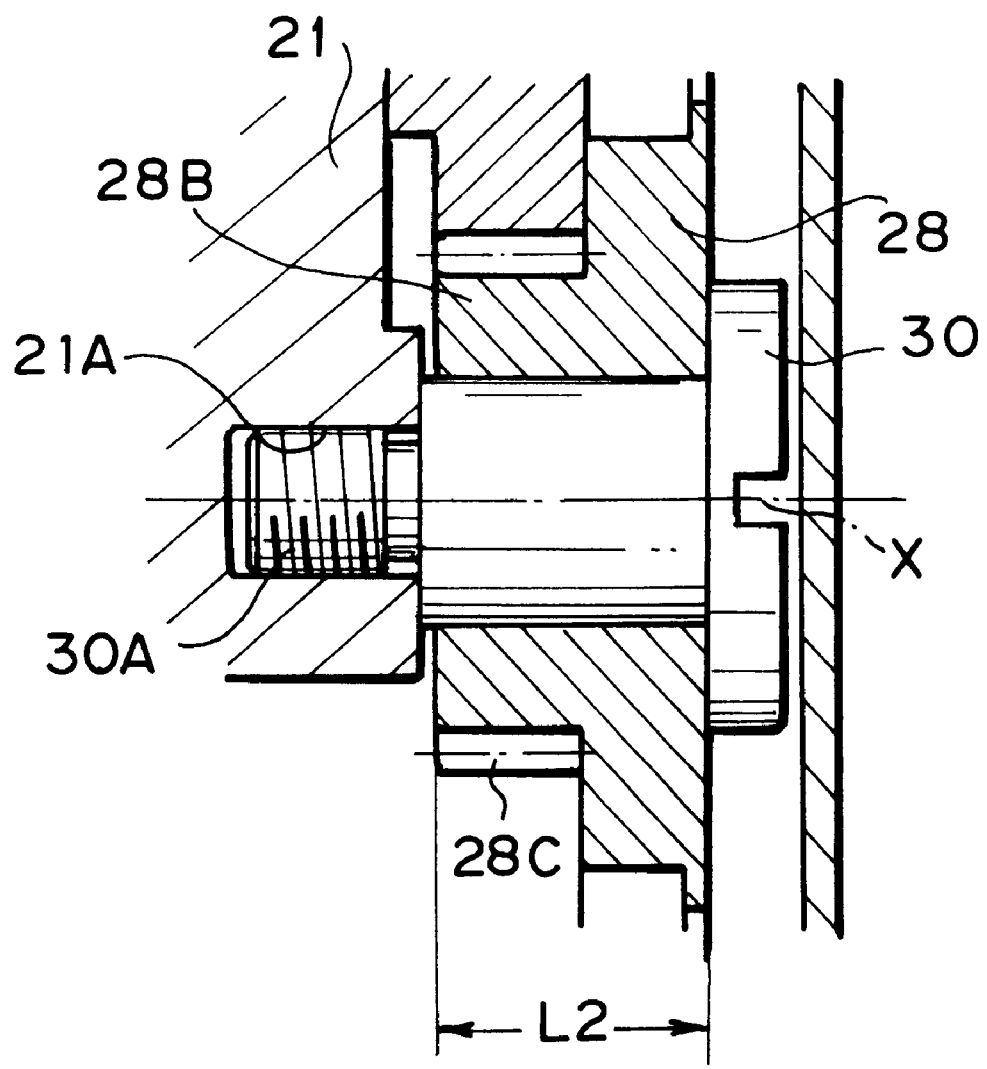
FIG. 4 is an enlarged view of an axis member shown in FIG. 3.

Also, as shown in FIG. 2, since the axis section 8B is projected in front of and behind the filter disk 8 such that both ends thereof are respectively supported by the housing 1 and the dust cover 4, fitting length L1 of the axis section 8B can be made greater than the fitting length L2 of the prior art shown in FIG. 4. Accordingly, fluctuation of the filter disk 8 upon rotation can be reduced. Consequently, the filter 9 is prevented from tilting and being obliquely disposed with respect to the optical axis of the color separation prism 6 and thereby deteriorating the optical performance. Also, the peripheral portion of the filter disk 8 is prevented from rotating while abutting to the filter 3 or the dust cover 4 and thereby yielding a powder of wear dust.

Though the filter disk 8 is manually rotated by means of the driving knob 11 in the foregoing embodiment, a motor may rotate the rotation axis 11A so as to revolve the filter disk 8.

Also, while the gear section 8C is formed in the axis section 8B such that the filter disk 8 is rotated by way of the idle gear 13 and the gear 12 in the foregoing embodiment, a gear section may be formed in the peripheral portion of the disk holding section 8A of the filter disk 8, and this gear section and the gear 12 attached to the rotation axis 11A of the driving knob 11 may engage with each other so as to rotate the filter disk 8.

As explained in the foregoing, in the optical filter apparatus in accordance with the present invention, since the filter loading disk and the rotation axis are unitedly formed, as compared with the prior art in which the filter loading disk and the rotation axis are separately provided, the number of parts therein can be reduced, while the manufacturing step for fitting the rotation axis into the filter loading disk can be eliminated. Accordingly, due to the reduction in the number of parts and the number of manufacturing steps, the manufacturing cost can be decreased.

Also, since the rotation axis is projected in front of and behind the filter loading disk and supported by the housing member disposed in front of and behind the filter loading disk, the fitting length of the rotation axis can be made relatively large. Accordingly, the filter loading disk is prevented from fluctuating upon rotation. Therefore, the filter loading disk is prevented from tilting, and the peripheral portion thereof is prevented from abutting to the housing member placed in front of and behind it and thereby deteriorating the optical performance and yielding a powder of wear dust.

What is claimed is:

1. An optical filter apparatus comprising:
   a single piece filter loading disk and rotation axis member;
   wherein the single piece filter loading disk and rotation axis member has a plurality of filters disposed around the rotation axis member, that is placed in front of a color separation prism and is rotated around a rotation axis so as to position a desired filter onto an optical axis of said color separation prism; and
   wherein said single piece filter loading disk and rotation axis member is projected in front of and behind a filter loading disk portion of the single piece filter loading disk and rotation axis member and supported by a housing member disposed in front of and behind said filter loading disk portion.

2. An optical filter apparatus according to claim 1, wherein said filter loading disk and said rotation axis member are formed in a single piece by injection molding of a plastic material.

3. An optical filter apparatus according to claim 2, wherein said plastic material is polycarbonate.

4. An optical filter apparatus according to claim 1, wherein one end of said rotation axis member is fitted into a hole formed in said housing member, whereas the other end of said rotation axis member is fitted into a hole formed in a dust cover which is attached to said housing.

5. An optical filter apparatus according to claim 1 wherein the filter loading disk and the rotation axis member are made of the same material.

* * * * *